Feb. 17, 1970  J. F. HEMENS  3,495,786
HARNESS REELS

Filed Feb. 16, 1968  2 Sheets-Sheet 1

Feb. 17, 1970 J. F. HEMENS 3,495,786
HARNESS REELS
Filed Feb. 16, 1968 2 Sheets-Sheet 2
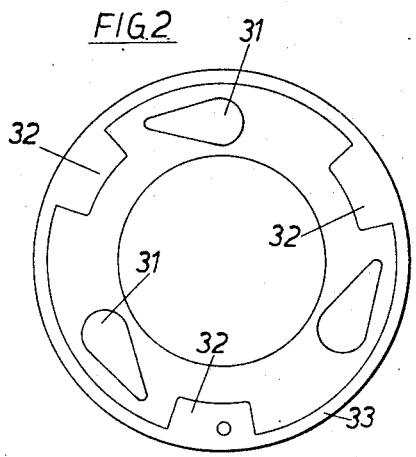
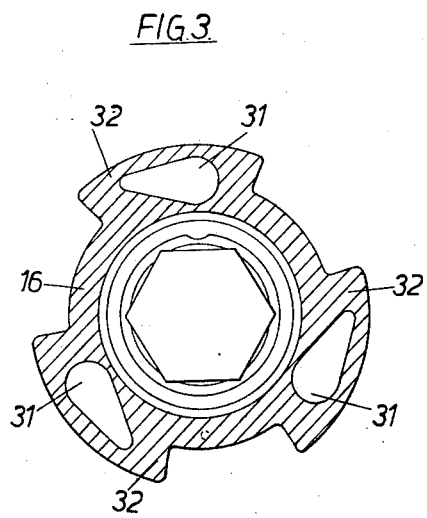
Inventor
James Frederick Hemens
By Dowell & Dowell
Attorneys

# United States Patent Office 3,495,786
Patented Feb. 17, 1970

3,495,786
HARNESS REELS
James Frederick Hemens, Chelmsford, England, assignor to Teleflex Products Limited, Basildon, Essex, England, a British company
Filed Feb. 16, 1968, Ser. No. 708,473
Claims priority, application Great Britain, Feb. 17, 1967, 7,794/67
Int. Cl. B65h 75/30
U.S. Cl. 242—107.4                     6 Claims

ABSTRACT OF THE DISCLOSURE

An improvement is made in the known kind of inertia-operated vehicle safety harness reel in which two rotary members, one constituting an inertia plate while the other is fast with the reel spindle, ordinarily rotate as one due to an interconnection by means of balls but in a vehicle emergency the inertia plate is relatively retarded and the resulting relative angular movement of the two rotary members causes the inertia plate to shift axially away from the other rotary member and into locking arrangement with the reel frame by reason of a camming action exerted by the balls in their recesses. In prior reels of this type, locking of the reel spindle was due to the jamming of the balls and the locking torque was thus transmitted through the balls. The improvement now provided comprises cooperating dogs on the two rotary members which are constantly in mesh but with limited lost motion; these intermeshing dogs transmit the torque when the reel is locked, the lost motion permitting the necessary limited relative angular movement of the two rotary members to produce locking.

---

Figure 1:
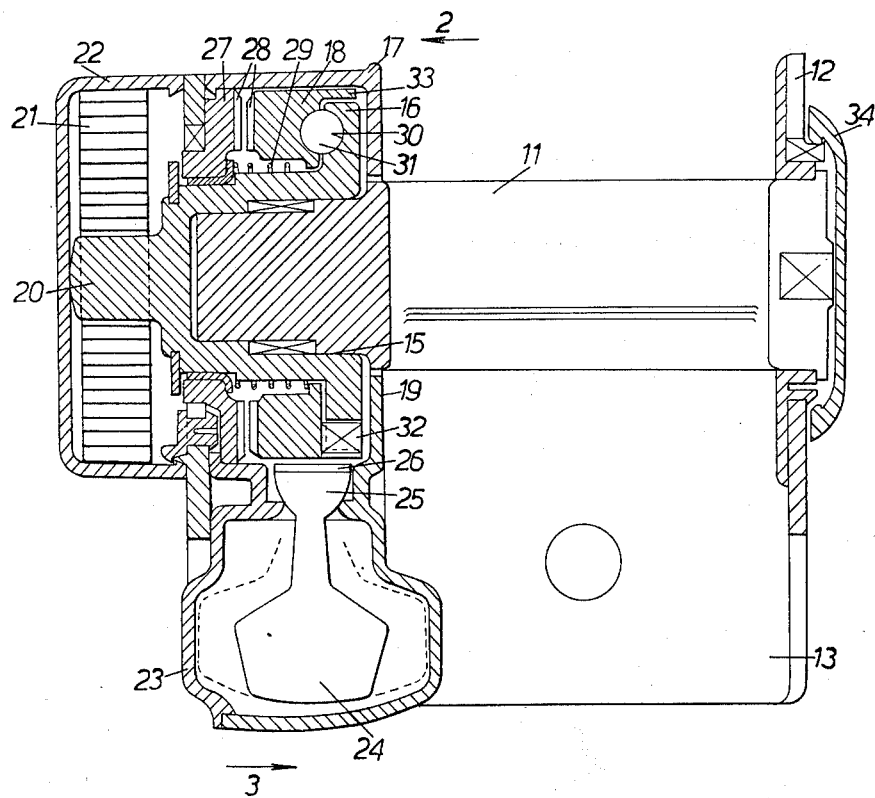

This invention relates to harness reels, and more particularly vehicle safety harness reels of the automatically-locking type.

In a known form of reel that locks automatically in consequence of servo vehicle deceleration, hereinafter referred to as a harness reel of the type described, two co-axially-mounted rotary members that normally rotate together have associated cam means that forces them to move apart axially if one of said members is retarded in its rotation with respect to the other, the non-retarded member rotating as one with the reel shaft or spindle while the other is arranged to be shifted into engagement with stationary brake or lock means by said axial movement. Once the retarded member has been arrested and locked in this way the locking action is transmitted to the non-retarded member and hence the reel shaft, by jamming of the cam means. It is an object of this invention to avoid subjecting the cam means to the torque reaction due to locking.

According to the present invention, the two rotary members are provided with interengaging dogs that sustain the torque reaction due to locking but are nevertheless designed with sufficient free movement or back-lash to permit to occur that relative rotation between the members which is necessary to occasion locking. The cam means may conveniently comprise balls interposed between the two rotary members and lodged partly in appropriately shaped recesses in one and partly in similarly shaped recesses in the other.

In the preferred arrangement, the retarded rotary member is an inertia member that lags behind when the non-retarded member undergoes an unusually rapid angular acceleration. By this means the reel is caused to look upon a sharp pull on the harness strap received on the reel, as is well known in itself. Preferably also, means such as a pendulum weight is provided which is directly responsive to vehicle acceleration and which is arranged to check or retard the rotation of the inertia member when an unusually severe acceleration or deceleration is experienced. In this way two independent locking responses are achieved giving a high degree of safety.

The invention also includes other features of an optional nature to be found in the following description of one specific embodiment.

One form of construction in accordance with the invention will now be described by way of example with reference to the accompanying drawings, in which:

FIGURE 1 is a longitudinal section through a harness reel embodying the invention, FIGURE 2 is a view of an inertia ring in the reel seen in the direction of the arrow 2 of FIGURE 1, and FIGURE 3 is a view of a drive plate in the reel seen in the direction of the arrow 3 of FIGURE 1.

The inertia reel to be described has a shaft or spindle 11 journalled at one end in a bearing carried by an end wall 12 of a frame 13. At its other end the shaft passes through a second end wall 19 of the frame and is received in an axial bore 15 formed in the hub of a rotary drive plate 16 constituting a first rotary clutch member, the shaft and drive plate being keyed to one another to rotate as one. Between the frame end walls 12, 19 the shaft is formed as a reel spool to receive a harness strap (not shown) which is coiled thereon and paid out or reeled in as the shaft rotates.

Between the end walls 12, 19 of the frame 13 is provided a housing 17 for an inertia ring 18 constituting a second rotary clutch member. The housing 17 is closed at its end remote from the wall 14 by the frame end wall 19, and the hub of the drive plate 16 projects through an aperture in the end plate and is formed with a spigot 20 to which is attached the inner end of a coiled retraction spring 21 surrounding the spigot. This spring serves to rotate the reel shaft for the purpose of automatically reeling in slack in the harness strap. The outer end of the retraction spring coil is attached to a casing 22. This spring casing normally occupies a fixed position but can be adjusted angularly at will on the frame for the purpose of setting the spring tension.

The lower part of the housing 17 provides a well 23 in which hangs a pendulum or bob weight 24. The head 25 of the pendulum, upon which it hangs, has an upper face substantially level with the floor of the housing 17 and is surfaced with high friction material 26. The function of this pendulum weight will be hereinafter described.

Within the housing 17 immediately inside the frame end wall 19 there is disposed a fixed brake ring 27 which is keyed to the end wall 19. The inertia ring 18 has a main body lying between the brake ring 27 and a radial flange of the drive plate 16, and the adjacent faces of the brake ring and the inertia ring have cooperating teeth 28. Normally, a spring 29 urges the inertia ring axially away from the brake ring so that the teeth 28 are out of engagement. In the face of the flange of the drive plate 16 which is adjacent the inertia ring 18 there are provided three equiangularly-spaced recesses 30 which have substantially hemispherical portions and lead-out portions of progressively decreasing depth. Likewise, the radial face of the inertia ring adjacent the drive plate flange has three similar recesses and three balls 31 are lodged in between the inertia ring and the drive plate, each ball normally lying partly in the hemispherical portion of a recess in the drive plate and partly in the corresponding portion of a recess in the inertia ring. The lead-out portions of the recesses in the drive plate are directed oppositely to those in the inertia ring.

In normal operation, the inertia ring and drive plate rotate together by reason of the balls 31. In the event of a sudden pull on the strap due to jerking of the body of the wearer of the harness as could be occasioned by unduly rapid deceleration of the vehicle, the reel shaft accelerates angularly at a greater rate than usual and as a consequence the inertia ring 18 lags in rotation with respect to the drive plate 16. When this happens the balls 31 no longer remain in the hemispherical portions of their recesses but ride into the shallower lead-out portions with the result that the inertia ring and drive plate are cammed apart axially. The inertia ring moves toward the brake ring 27 against the action of the spring 29 and the teeth 28 engage to lock the inertia ring against further rotation.

Hitherto, locking of the reel shaft, upon locking of the inertia ring in the manner just described, has resulted by reason of the jamming action of the balls. In the present arrangement, however, the torque reaction upon locking is not sustained by the balls but instead the drive plate and inertia ring have interengaging dogs 32. These dogs are always in intermeshing relationship but a predetermined back-lash is provided sufficient to allow the inertia ring to move away from the drive plate flange in a helical path for engagement of the brake. The inertia ring is of greater diameter than the drive plate flange and has a sleeve portion 33 surrounding said flange, the interengaging dogs 32 being provided within the sleeve 33 and on the periphery of the drive plate. This arrangement gives a greater radius of gyration of the inertia ring and affords proper support to the dogs.

A second type of locking action may occur due to the pendulum weight 24. While the locking action already described only takes place after the harness wearer's body has been jerked, the pendulum weight is responsive directly to vehicle accelerations. A usually severe acceleration or deceleration of the vehicle will cause the weight 24 to swing far enough out of the vertical to bring the face 26 of the pendulum head into contact with the periphery of the inertia ring 18. The inertia ring is therefore retarded in its rotation with respect to the reel shaft and drive plate 16 and locking occurs as before.

By removal of a flexible seal cap 34 from the end wall 12 of the frame 13 access is obtained to one end of the shaft 11. This shaft end is formed to receive a key or screwdriver whereby the shaft may be held against rotation by the retraction spring during strap fitting or removal and spring torque adjustment.

What I claim is:

1. An inertia-operated safety harness reel for vehicles, comprising a reel frame, a reel spindle mounted for rotation in the frame, a real retraction spring acting on the reel spindle, first and second lost motion rotary clutch members mounted coaxially with the reel spindle and having cooperating dogs that are permanently in intermeshing relationship but with sufficient lost motion to allow limited relative angular movement of said first and second clutch members before the dogs mutually engage to prevent further relative angular movement, said first clutch member being fast with the reel spindle to rotate as one therewith, said second clutch member being mounted for both limited angular and limited axial travel with respect to said reel spindle and first clutch member, spring means to urge said second clutch member to one limit of said axial travel, first lock means on said second clutch member cooperating with secondary stationary lock means on the frame to lock said second clutch member against rotation relative to the frame, said first and second cooperating lock means being out of engagement at said one limit of axial travel of said second clutch member but entering into engagement when said second clutch member shifts axially to its other limit of axial travel, and cooperating cam means acting between said first and second clutch members to cam said second clutch member axially from said one to said other limit of its axial travel upon occurrence of said limited relative angular movement of the clutch members whereafter said reel spindle and said second clutch member become locked against rotation with respect to said frame through the agency of said lock means and said intermeshing dogs with substantially no transmission of locking torque through said cam means, said second clutch member normally rotating as one with said first clutch member and reel spindle but being angularly retarded reltaive thereto by inertia effect to initiate reel spindle locking under conditions of vehicle emergency.

2. A reel according to claim 1, wherein said cam means comprise balls interposed between said first and second rotary clutch members and lodged partly in appropriately shaped recesses in one and partly in similarly shaped recesses in the other.

3. A reel according to claim 1, wherein said second rotary clutch member is itself an inertia ring that lags behind when the non-retarded member undergoes an unusually rapid angular acceleration.

4. A reel according to claim 3, wherein a second inertia means is provided which is directly responsive to vehicle accelerations and arranged to retard the rotation of said inertia ring when an unusually severe acceleration or deceleration is experienced.

5. A reel according to claim 3, wherein said inertia ring is of greater diameter than said first rotary clutch member and has an axially-extending sleeve portion surrounding the periphery of said first clutch member, the aforesaid dogs being inside said sleeve and on said periphery respectively.

6. A reel according to claim 1, wherein one end of the reel spindle is accessible by removal of a flexible seal cap from an end wall of the reel frame, and is adapted to receive a tool for holding it against rotation by the reel retraction spring.

References Cited

UNITED STATES PATENTS

| 2,650,655 | 9/1953 | Neahr et al. | 242—107.4 XR |
| 3,012,736 | 12/1961 | Brust | 242—107.5 |
| 3,058,687 | 10/1962 | Bentley | 242—107.4 |
| 3,202,379 | 8/1965 | Wrighton et al. | 242—107.4 |
| 3,203,641 | 8/1965 | McFarlane et al. | 242—107.4 |
| 3,402,899 | 9/1968 | Wright et al. | 242—107.4 |
| 3,415,462 | 12/1968 | Barecki et al. | 242—107.4 |

FOREIGN PATENTS 1,371,148   7/1964   France.

STANLEY N. GILREATH, Primary Examiner

WERNER H. SCHROEDER, Assistant Examiner